No. 881,341. PATENTED MAR. 10, 1908.
J. A. RAIFORD.
PLOW FENDER.
APPLICATION FILED MAY 18, 1907.
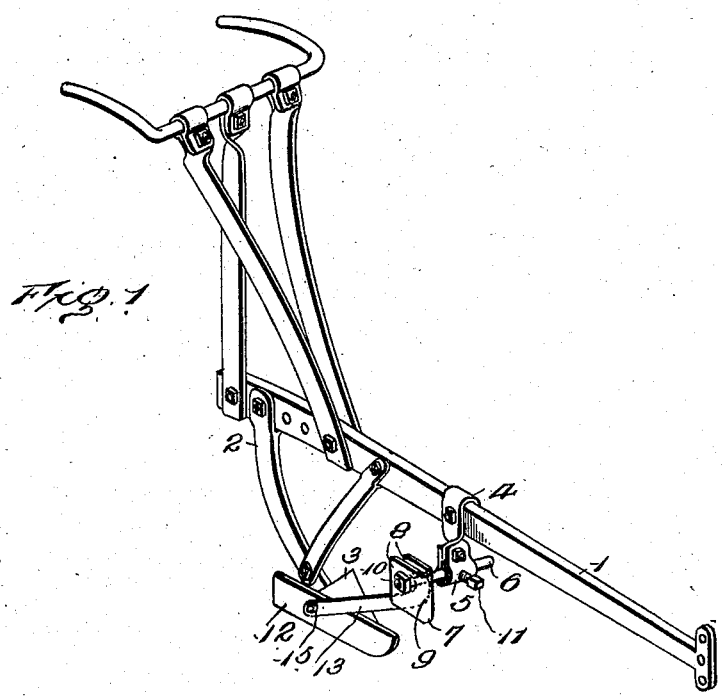
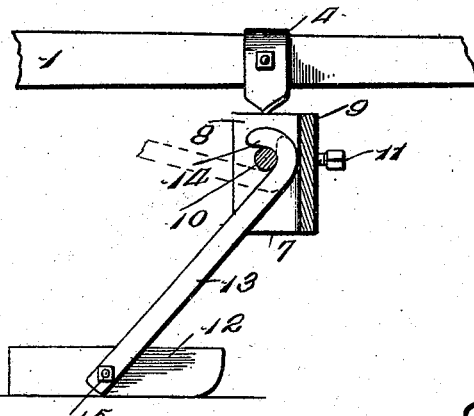
Inventor
J. A. Raiford
Witnesses
By R. A. R. Lacey,
Attorneys

UNITED STATES PATENT OFFICE.

JAMES A. RAIFORD, OF COLUMBUS, GEORGIA.

PLOW-FENDER.

No. 881,341.     Specification of Letters Patent.     Patented March 10, 1908.

Application filed May 18, 1907. Serial No. 374,402.

*To all whom it may concern:*

Be it known that I, JAMES A. RAIFORD, citizen of the United States, residing at Columbus, in the county of Muscogee and State of Georgia, have invented certain new and useful Improvements in Plow-Fenders, of which the following is a specification.

The present invention relates in general to cultivators, and more particularly to a fender attachment for use in connection with cultivating plows for the purpose of preventing the clods of earth from rolling over upon the young plants and interfering with their proper development.

One of the primary objects of the invention is the provision of novel means for attaching the fender to the plow, whereby the same may be readily adjusted to accommodate itself to inequalities of the surface of the ground when in use, and which also permits the fender to be detached from or applied to the plow without the use of tools.

For a full understanding of the invention and the merits thereof and also to acquire a knowledge of the details of construction of the means for effecting the result, reference is to be had to the following description and accompanying drawings, in which:

Figure 1 is a perspective view showing the fender applied to a cultivator; and, Fig. 2 is a detail view of the fender, portions being broken away.

Corresponding and like parts are referred to in the following description and indicated in all the views of the drawings by the same reference characters.

The invention is shown as applied to a shovel plow comprising the beam 1 and the stock 2 carrying the plow 3. A bracket 4 is pendent from an intermediate portion of the beam 1 and carries a bearing 5 receiving a shaft 6. This bracket is in the nature of a strap having the lower end thereof returned upon itself to form the bearing 5 and provided with the clamping bolt 11. A clip 7 is applied to one end of the shaft 6 and comprises spaced sides 8 connected along one edge, as indicated at 9, and also connected by a pin 10 forming a continuation of the shaft 6. By turning the shaft 6 within the bearing 5, the clip 7 can be set at any desired angle and locked rigidly in position by means of the clamping bolt 11. The fender blade 12 is connected to the arm 13 by means of a bolt 15 and can be adjusted to any desired angle with respect thereto when the bolt is loosened. A hooked formation, as indicated at 14, is imparted to the upper extremity of the arm 13 and this hooked portion is designed to be received within the clip 7 and detachably engage the pin 10. When the arm 13 extends downwardly in normal position, the hook 14 is held in engagement with the pin 10 by the edge 9 of the clip, whereas when the arm is swung rearwardly and upwardly, the hook 14 can be disengaged from the pin and the fender detached from the plow. Attention is also again directed to the fact that with this construction, the fender can be readily attached to the plow or detached therefrom, as may be desired, without the use of a tool or the necessity of removing any bolts or other fastening members.

Having thus described the invention, what is claimed as new is:

1. The combination of a cultivator, a clip, means for securing the clip to the cultivator beam, an arm having a hooked connection with the clip, and a fender carried by the arm.

2. The combination of a cultivator, a clip, means for securing the clip to the beam, means for adjusting the clip, an arm having a hooked connection wth the clip, and a fender carried by the arm.

3. The combination of a cultivator, a clip comprising spaced sides connected along one of their edges and also connected by a pin, means for securing the clip to the cultivator beam, an arm having a hooked connection with the pin and normally held in engagement therewith by the member connecting the sides of the clip, and a fender carried by the arm.

4. The combination of a cultivator, a bracket mounted upon the cultivator beam, a clip, means for adjustably connecting the clip to the bracket, an arm having a detachable and interlocking connection with the clip, and a fender carried by the arm.

5. The combination of a cultivator, a bracket mounted upon the cultivator beam, and provided with a bearing, a shaft received by the bearing, a clip carried by the shaft, an arm loosely connected to the clip, and a fender carried by the arm.

6. The combination of a cultivator, a bracket mounted upon the cultivator beam and formed with a bearing, a shaft received by the bearing, a clip carried by the shaft and comprising spaced sides connected along one of their edges and also connected by a pin, an arm having a hooked connection with the pin, and a fender carried by the arm.

In testimony whereof I affix my signature in presence of two witnesses.

JAMES A. RAIFORD. [L. S.]

Witnesses:
J. DU PONT KIRVEN,
WM. W. HUNT.